United States Patent
Yoshimura (10) Patent No.: US 7,496,213 B2
(45) Date of Patent: Feb. 24, 2009

(54) VEHICLE PERIPHERAL VISUAL CONFIRMATION APPARATUS

(75) Inventor: Akinobu Yoshimura, Mie (JP)

(73) Assignees: Autonetworks Technologies, Ltd., Mei (JP); Sumitomo Wiring Systems, Ltd., Mei (JP); Sumitomo Electric Industries, Ltd., Osaka (JP)

( * ) Notice: Subject to any disclaimer, the term of this patent is extended or adjusted under 35 U.S.C. 154(b) by 566 days.

(21) Appl. No.: 11/109,645

(22) Filed: Apr. 20, 2005

(65) Prior Publication Data

US 2005/0238203 A1    Oct. 27, 2005

(30) Foreign Application Priority Data

Apr. 21, 2004    (JP)    ............... 2004-125783

(51) Int. Cl.
*G06K 9/00*    (2006.01)
(52) U.S. Cl. .................................................. 382/103
(58) Field of Classification Search ............... 382/103, 382/104
See application file for complete search history.

(56) References Cited

U.S. PATENT DOCUMENTS

| | | | | |
|---|---|---|---|---|
| 6,483,429 | B1 * | 11/2002 | Yasui et al. .................. | 340/435 |
| 6,593,960 | B1 * | 7/2003 | Sugimoto et al. ........... | 348/148 |
| 6,985,171 | B1 * | 1/2006 | Kuriya et al. ................ | 348/148 |
| 7,034,861 | B2 * | 4/2006 | Okada et al. .................. | 348/36 |

FOREIGN PATENT DOCUMENTS

| | | |
|---|---|---|
| DE | 100 83 445 T1 | 11/2001 |
| WO | WO 03/084232 A1 | 10/2003 |

* cited by examiner

*Primary Examiner*—Tom Y Lu
(74) *Attorney, Agent, or Firm*—Oliff & Berridge, PLC (57) ABSTRACT

When coordinate transformation such as viewpoint conversion is performed on source video images from cameras, the conversion table of each of the cameras is not stored in an image processing ECU. Instead, each of the cameras possesses the conversion table. Accordingly, it is not necessary to use an expensive nonvolatile memory of large capacity in the image processing ECU. Furthermore, addition or change of the cameras can be performed without trouble.

5 Claims, 4 Drawing Sheets

VEHICLE PERIPHERAL VISUAL CONFIRMATION APPARATUS

BACKGROUND OF THE INVENTION

1. Field of the Invention

The present invention relates to a vehicle peripheral visual confirmation apparatus for acquiring a video image of the periphery of a vehicle and then displaying the image on a displaying member in a compartment, as well as its relevant technique.

2. Description of the Related Art

In the field of vehicles, for example, in order that drivers may easily check areas serving as dead angles in the vehicle periphery, vehicle peripheral visual confirmation apparatuses are used in which the periphery of a vehicle is image-acquired with a camera installed in the rear, the front, a side, or the like of the vehicle so that the image is displayed on a display unit such as a liquid crystal panel installed in the compartment.

Requirements placed on these vehicle peripheral visual confirmation apparatuses include, for example, the following two points.

(1) Pedestrians, obstacles, and the like in the periphery of the vehicle can be checked through a video image of a camera.

(2) At the time of moving backward, the sense of distance to obstacles such as another vehicle and a wall can be obtained with precision on the order of 10 cm or the like.

Figure 5:
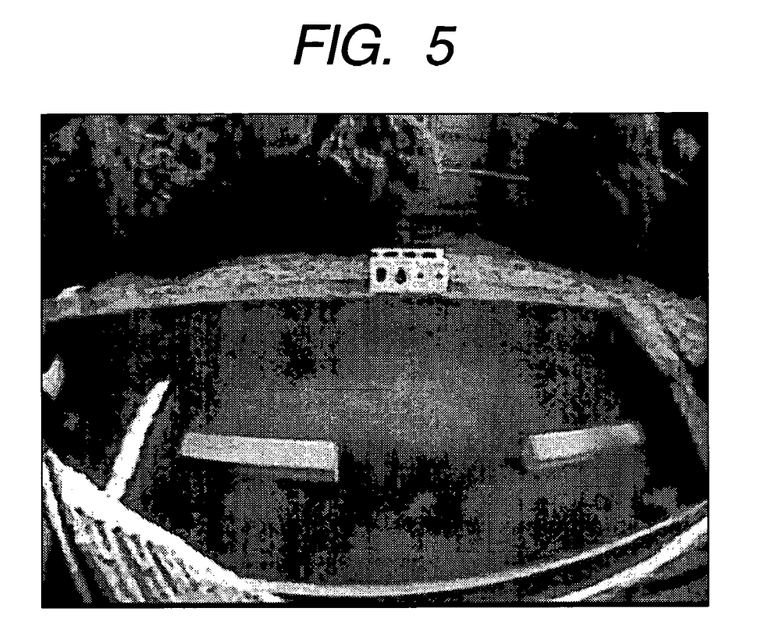
FIG. 5 is a view showing a source video image acquired by a camera.
Figure 6:
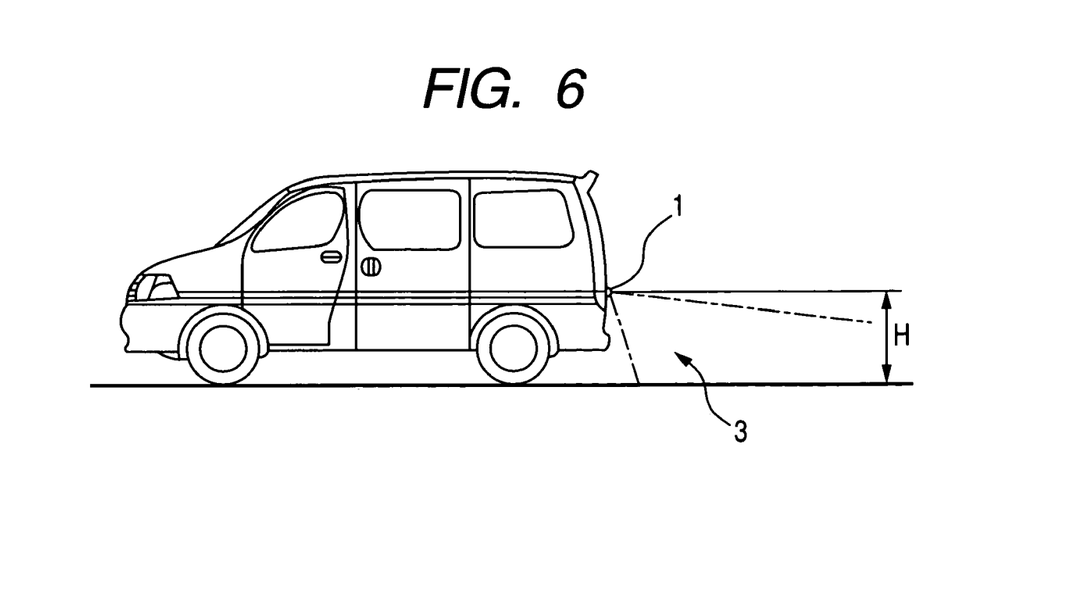
FIG. 6 is diagram showing an example of an installed position of a camera in a vehicle.

Among these, point (1) is achieved using the source video image of an ordinary camera. FIG. 5 shows an example of a source video image of the rearward of a vehicle acquired by a camera attached at the rear of the vehicle. In this source video image, the installed position of the camera 1 is fixed at height H from the ground surface as shown in FIG. 6 so that the source video image within the field of view 3 of the camera 1 is acquired as viewed aslant downward from a viewpoint.

At that time, in the source video image of FIG. 5 viewed aslant downward from a viewpoint, the installed position of the camera 1 generally differs from a person's visual confirmation height. This and other reasons do not necessarily permit easy confirmation of the distance between a perimeter obstacle and the vehicle, regardless of the above-mentioned requirement (2).

Figure 7:
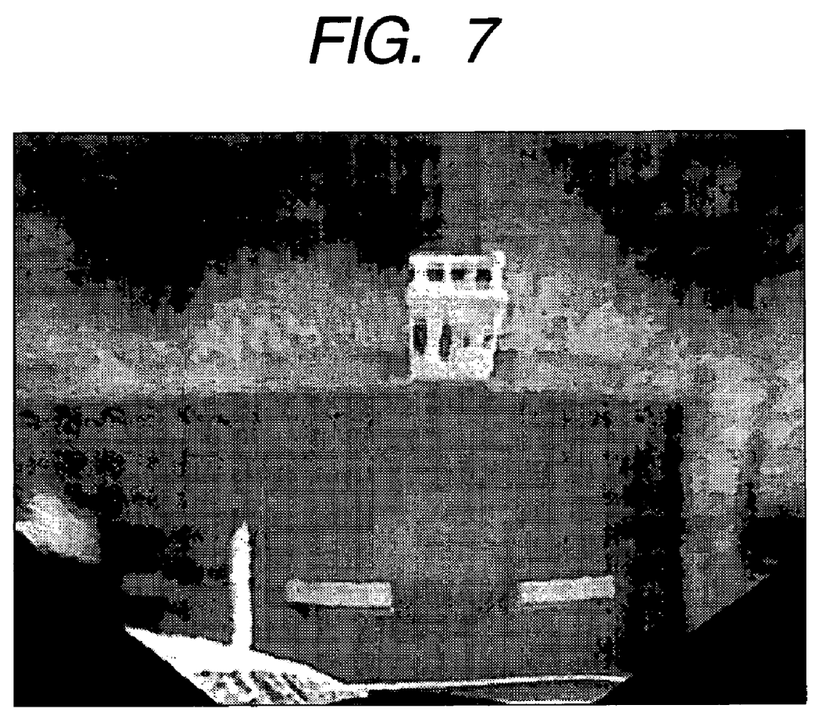
FIG. 7 is a view showing an example of a video image in which coordinate transformation into plane view coordinates is performed by geometrical correction in a vehicle peripheral visual confirmation apparatus according to the related art.

Thus, in order that the sense of distance to obstacles such as another vehicle and a wall should be obtained with precision on the order of 10 cm or the like as required in (2), a technique of viewpoint conversion such as the application of geometrical correction on the image has been used so that the source video image viewed aslant downward from a viewpoint is converted, for example, into a video image of plane view coordinates as shown in FIG. 7 so that the sense of distance would be confirmed easily.

SUMMARY OF THE INVENTION

In the case that a camera is installed at each of a plurality of sites of a vehicle so that a plurality of cameras are switched depending on various situations of the vehicle such as going backward and forward so that an image is displayed on a display unit, when geometrical correction is performed for coordinate transformation into plane view coordinates as shown in FIG. 7, a conversion table for the coordinate transformation needs to be prepared for every camera owing to (the difference of) the installed position of each camera and from the aspect of the visibility of the displayed image on the display unit.

Nevertheless, for example, when a single image processing ECU is to be provided in the display unit so that the conversion tables are to be stored in this image processing ECU in advance, a memory area for storing all the conversion tables corresponding to the source video images from a plurality of the cameras is necessary in the image processing ECU. Thus, when the number of cameras increases as described above, the data of the conversion tables increases notably.

Furthermore, as for the source video image acquired from each camera, the following parameters for geometrical transformation may be occasionally necessary for each model or the like of a vehicle to which the camera is attached.

(1) The distortion coefficient of the lens (that is, distortion correction for the lens may be occasionally necessary performed before the process of viewpoint transformation; such distortion correction is necessary in wide angle cameras);

(2) the setting angle of the camera relative to the ground surface; and (3) the installation height of the camera relative to the ground surface, that is, the deviation from the center of the direction of movement (in other words, in many cases, cameras cannot be installed in ideal locations owing to a problem in the design of the vehicle; namely, the back camera and the like is deviated from the center of the vehicle in many cases).

As such, three parameters may be occasionally required for geometrical correction. Furthermore, when plural kinds of modes of coordinate transformation for each camera are to be realized, and when different conversion tables are to be prepared for all of these situations, then a large number of conversion tables need to be prepared in advance. This causes the necessity for storing a large number of conversion tables in the image processing ECU in advance, or alternatively of installing a different image processing ECU depending on the model or the like of the vehicle. These cause inconvenience.

Furthermore, the data size of the conversion table is determined as the address data times the pixel number of the destination. For example, QVGA (Quarter Video Graphics Array) requires a data size of $(9+8)$ bit$\times 320\times 240=1,305$ Mbit, while VGA (Video Graphics Array) requires $(10+9)$ bit$\times 640\times 480=5,836$ Mbit.

As such, when the conversion table is used, even a single conversion table causes a large amount of memory usage. Thus, when a plurality of conversion tables are to be stored, a nonvolatile memory of large capacity need to be installed in advance. This increases the cost. Furthermore, it is useless to store in a nonvolatile memory in advance a large number of the conversion tables many of which are uncertain to be actually used in the coordinate transformation or not.

It is an object of the invention is to provide a vehicle peripheral visual confirmation apparatus in which a necessary memory capacity is reduced in a memory in an image processing member.

In order to solve the above-mentioned problem, according to one aspect of the invention, there is provided with a vehicle peripheral visual confirmation apparatus including: at least one imaging member imaging a vehicle's peripheral image; an image processing member selecting at least one of the imaging member, performing a predetermined coordinate transformation on the vehicle's peripheral image imaged by the selected imaging member; and a displaying member disposed on a vehicle compartment, and displaying the vehicle's peripheral image on which the predetermined coordinate transformation is performed, wherein the imaging member holds a conversion table of the predetermined coordinate transformation with respect to the vehicle's peripheral image, and wherein the image processing member performs the coordinate transformation on the basis of the conversion table of the imaging member selected by the image processing member.

By thus configuration, when predetermined coordinate transformation is performed on the source video image from the imaging member, the image processing member does not possess a conversion table for each imaging member, while each imaging member possesses the conversion table, so that the coordinate transformation is performed on the basis of the conversion table provided from the selected imaging member. Accordingly, it is not necessary to install an expensive non-volatile memory of large capacity into the image processing member.

Furthermore, since each piece of imaging member stores the conversion table in advance, even when the imaging member is added or changed later, what is necessary is merely to receive a conversion table from the new piece of imaging member in the image processing member. Thus, for example, even when an imaging member newly put on the market several years after a new car has been put on the market is to be added or changed, the addition or the change is achieved without trouble.

According to another aspect of the invention, the imaging member holds, in advance, identification information identifying the imaging member. The identification information is transmitted to the image processing member.

In the vehicle peripheral visual confirmation apparatus according to the second aspect of the invention, the imaging member possesses identification information in advance so that the identification information is transmitted to the image processing member. This ensures the video images provided from plural imaging members to be processed by coordinate transformation using the proper conversion tables.

According to another aspect of the invention, the image processing member stores the conversion table acquired from the imaging member and the identification information corresponding to the conversion table, into a predetermined volatile storage member. Only when the identification information acquired from the imaging member differs from the identification information stored in the volatile storage member, the conversion table is transmitted from the imaging member to the image processing member.

By thus configuration, the image processing member stores the conversion table and identification information provided from the imaging member into the predetermined a volatile storage member in a mutually corresponding manner. Then, only when the identification information provided from the imaging member differs from the identification information stored in the volatile storage member, the conversion table is transmitted to the image processing member from the imaging member. Thus, the conversion table is transmitted only when the selection of the imaging member is changed. This avoids useless communication in the in-vehicle communications network such as an in-vehicle LAN.

According to another aspect of the invention, the imaging member holds information on image size of the vehicle's peripheral image acquired by the imaging member. The information on the image size is transmitted to the image processing member.

By thus configuration, the imaging member possesses the information on the image size of the video image acquired by the imaging member so that the information on the image size is transmitted to the image processing member. Thus, even when a source video image of different image size is transmitted, a storage area within the image processing member is easily allocated for the corresponding conversion table and source video image.

According to another aspect of the invention, the imaging member includes a plurality of imaging members. The image processing member is capable of storing a conversion table of the plurality of imaging members.

By thus configuration, the image processing member can store the conversion table of plural imaging members. This avoids a repeated download of an original conversion table when the selection is changed back into an original imaging member. This permits effective use of an excess of storage area in the image processing member.

DESCRIPTION OF THE PREFERRED EMBODIMENTS

<Configuration>

Figure 1:
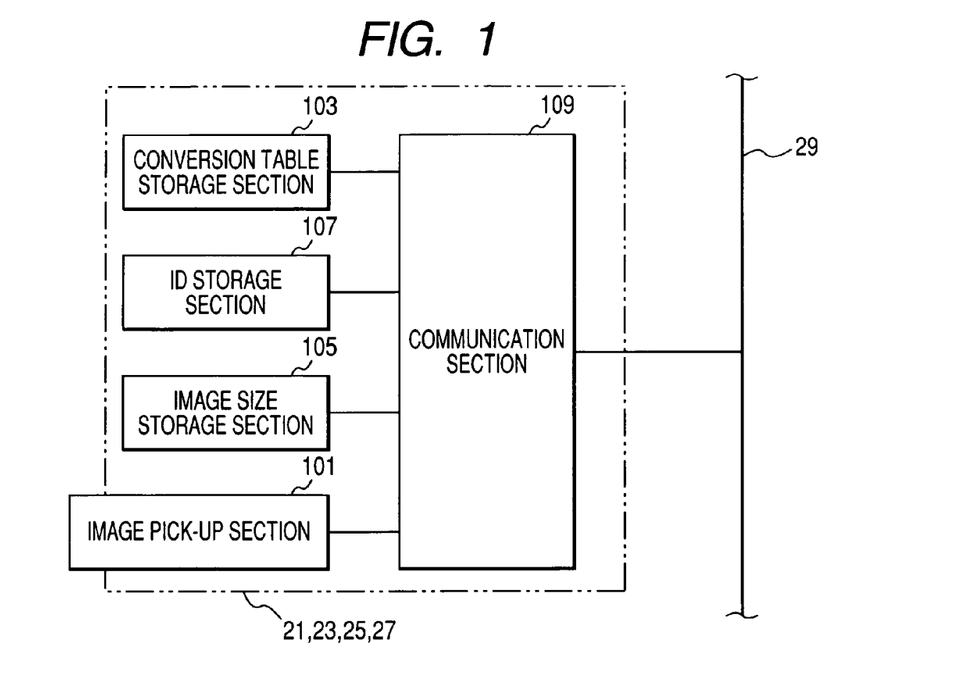
FIG. 1 is a block diagram showing a camera of a vehicle peripheral visual confirmation apparatus according to an embodiment of the invention.
Figure 2:
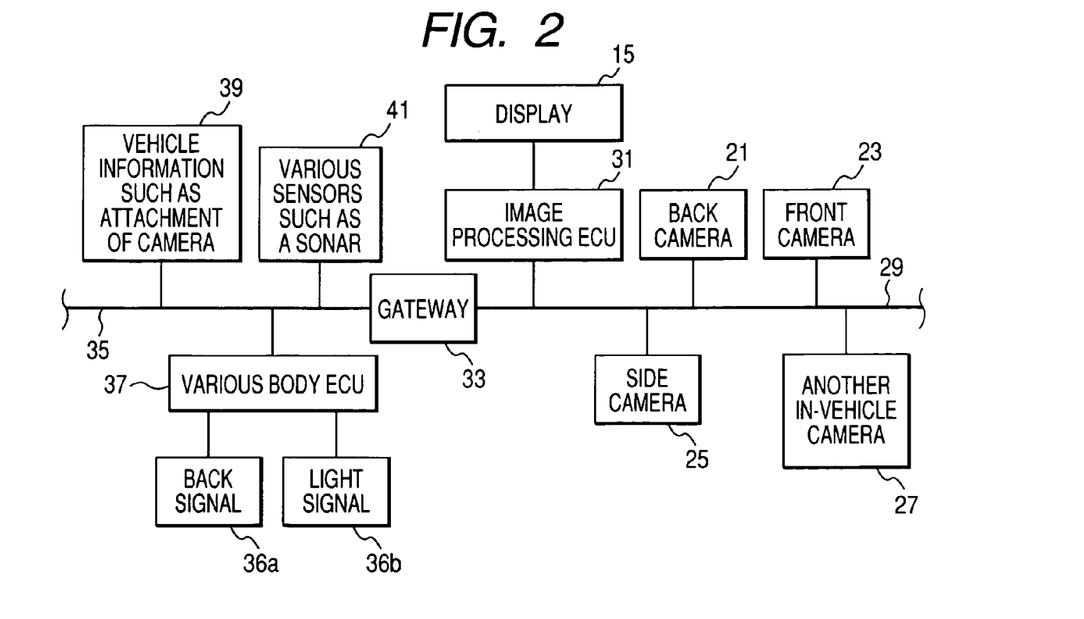
FIG. 2 is a block diagram showing a vehicle peripheral visual confirmation apparatus according to an embodiment of the invention.
Figure 3:
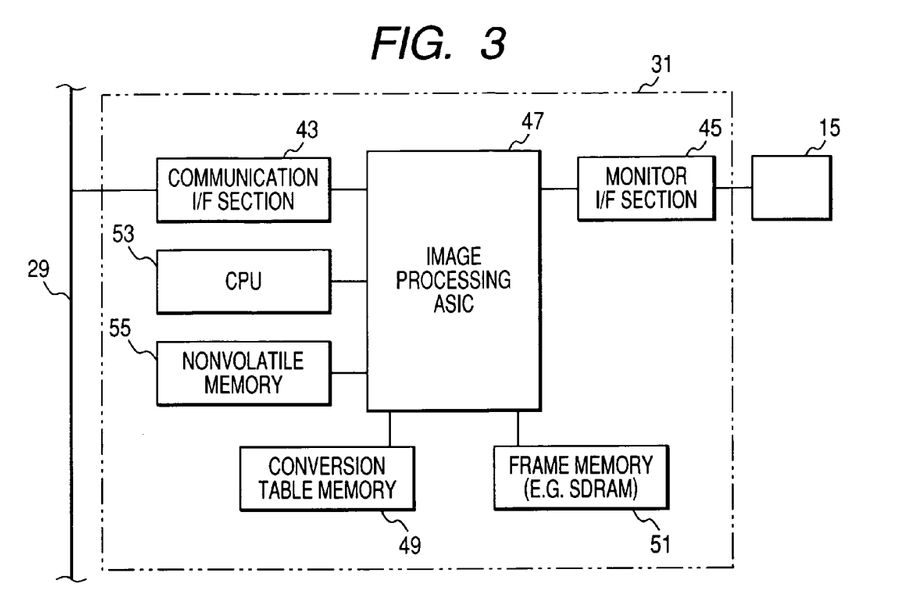
FIG. 3 is a block diagram showing the internal configuration of an image processing ECU of a vehicle peripheral visual confirmation apparatus according to an embodiment of the invention.

FIG. 1 is a block diagram showing a camera of a vehicle peripheral visual confirmation apparatus according to an embodiment of the invention. FIG. 2 is a block diagram showing a vehicle peripheral visual confirmation apparatus. FIG. 3 is a block diagram showing an image processing ECU.

In order that a crew such as a driver (user) in a compartment may check the safety of the periphery, the vehicle peripheral visual confirmation apparatus acquires a source video image of the periphery such as the rearward of a vehicle, for example, as shown in FIG. 5. Then, the source video image is processed by coordinate transformation so as to be visually easily confirmed by the user, for example, as shown in FIG. 7, and then displayed on a display unit 15. At that time, in particular, a conversion table for the coordinate transformation is possessed individually in each of cameras 21, 23, 25, and 27. Then, on the basis of the conversion table provided from a selected camera 21, 23, 25, or 27, an image processing ECU 31 performs coordinate transformation.

Specifically, as shown in FIG. 2, the vehicle peripheral visual confirmation apparatus is connected to a camera 21, a front camera 23, a side camera 25, and another in-vehicle camera 27 are connected to an in-vehicle LAN 29 serving as a video image transmission path. Then, a video image acquired by each of these cameras (an imaging member) 21, 23, 25, and 27 is received by the image processing ECU (image processing member) 31 via the in-vehicle LAN 29, and then image-processed by the image processing ECU 31 so as to be displayed on the display unit (display) 15.

In the configuration of FIG. 2, the in-vehicle LAN 29 is connected to another in-vehicle LAN 35 (in-compartment communications network) via a gateway 33. Then, the in-vehicle LAN 35 is connected to: a various body ECU 37 for transmitting and receiving a back signal 36*a*, a light signal 36*b*, and the like; a vehicle information output unit 39 relevant to the installation of the cameras 21, 23, 25, and 27; and various sensors 41 such as a speed sensor, a steering sensor, sonar, a vehicle information sensor, and the like.

As shown in FIG. 1, each of the cameras 21, 23, 25, and 27 comprises: a predetermined image pick-up section (imaging device) 101 such as a CCD; a conversion table storage section 103 for storing in advance a conversion table used in coordinate transformation performed on a video image acquired in the image pick-up section 101 before being displayed on the display unit 15; an image size storage section 105 for storing in advance the image size (resolution) of the video image acquired by the image pick-up section 101; a camera ID storage section 107 for storing in advance the own identification information (camera ID) of each of the cameras 21, 23, 25, and 27; and a communication section 109 for transmitting through the in-vehicle LAN 29 to the image processing ECU 31 the source video image acquired in the image pick-up section (an imaging device) 101 (FIG. 5), the conversion table stored in the conversion table storage section 103, the information on the image size detected in the image size storage section 105 and the identification information (camera ID) stored in the camera ID storage section 107. Preferably, the conversion table storage section 103, the image size storage section 105, and the camera ID storage section 107 are configured by the same storage medium, for example, a rewritable nonvolatile memory such as an EPROM and a flash ROM, so that the storage area in the storage medium is partitioned to each of the storage sections 103, 105, and 107.

As shown in FIG. 3, the image processing ECU 31 comprises: a communication I/F section 43 serving as a communication interface for communicating through the in-vehicle LAN 29; a monitor I/F section 45 connected to the display unit (display) 15; an image processing ASIC 47 for managing the image processing; a volatile conversion table memory (a volatile storage member) 49 for storing the conversion table transmitted from each of the cameras 21, 23, 25, and 27 for the coordinate transformation performed in the image processing ASIC 47; a frame memory 51 such as an SDRAM into which the image processing ASIC 47 stores the video image temporarily in the image processing; a CPU 53 for controlling the image processing ASIC 47; and a rewritable nonvolatile memory 55 for providing various parameters and the like in the image processing in the image processing ASIC 47.

Here, the frame memory 51 can store data of a larger size than the data per frame of the source video image.

The image processing ASIC 47 is provided with the functions of: selecting, for example, one from a plurality of the cameras 21, 23, 25, and 27 connected to the in-vehicle LAN 29; receiving (downloading) the identification information from the selected one of the cameras 21, 23, 25, and 27, and then storing the information into the conversion table memory 49; comparing the received (downloaded) identification information with the identification information already stored in the conversion table memory 49; receiving (downloading) the image size and the conversion table and then storing the data into the conversion table memory 49, only when the two pieces of identification information differ from each other; storing into the frame memory 51 the video signal of the source video image transmitted from the selected one of the cameras 21, 23, 25, and 27; performing image processing such as coordinate transformation on the source video image stored in the frame memory 51 with reference to the conversion table stored in the conversion table memory 49; and displaying the image-processed video image on the display unit 15 via the monitor I/F section 45.

Here, the conversion table is stored in the conversion table memory 49 in a manner corresponding to the identification information of the camera 21, 23, 25, or 27 that has provided the conversion table. Then, in the image processing ECU 31, when the camera 21, 23, 25, or 27 is changed in a state that electric power supplied to the image processing ECU 31 is maintained, the previous conversion table remains in the conversion table memory 49. Thus, the identification information provided from the newly selected one of the cameras 21, 23, 25, and 27 is compared with the identification information already stored in the conversion table memory 49. Then, when the two pieces of identification information agree with each other, the pieces of data (the image size and the conversion table) remaining in the conversion table memory 49 are used even after that. In contrast, when the two pieces of identification information do not agree, the identification information, the image size, and the conversion table provided from the newly selected one of the cameras 21, 23, 25, and 27 are stored and updated into the conversion table memory 49. In the coordinate transformation, the image processing ASIC 47 confirms, on the basis of the conversion table, the destination address of each pixel of the video image per frame which has been read from the frame memory 51, and thereby moves each pixel to the address so as to perform the process.

The information on the image size provided from each of the cameras 21, 23, 25, and 27 to the image processing ECU 31 is used when storage areas for the conversion table data and the video image data of the camera 21, 23, 25, or 27 are allocated respectively in the conversion table memory 49 and the frame memory 51 in the image processing ECU 31.

When the image processing ECU 31 selects a camera 21, 23, 25, or 27, a camera 21, 23, 25, or 27 corresponding to a predetermined logic condition set up in advance is selected on the basis of predetermined information from the various sensors 41 or alternatively on the basis of a user operation through a predetermined operation input unit. For example, when the speed sensor serving as one of the various sensors 41 detects a backward speed below a predetermined value, and when the sonar sensor serving as one of the various sensors 41 detects an obstacle at the rearward of the vehicle, the situation is determined on the basis of the information from the speed sensor and the sonar sensor, so that the back camera 21 is selected according to this situation of the vehicle. Furthermore, a camera 21, 23, 25, or 27 is also selected in response to a user operation through the operation input unit according to the user's desire.

The display unit 15 may be shared with a monitor unit in a car navigation system or the like.

<Operation>

Figure 4:
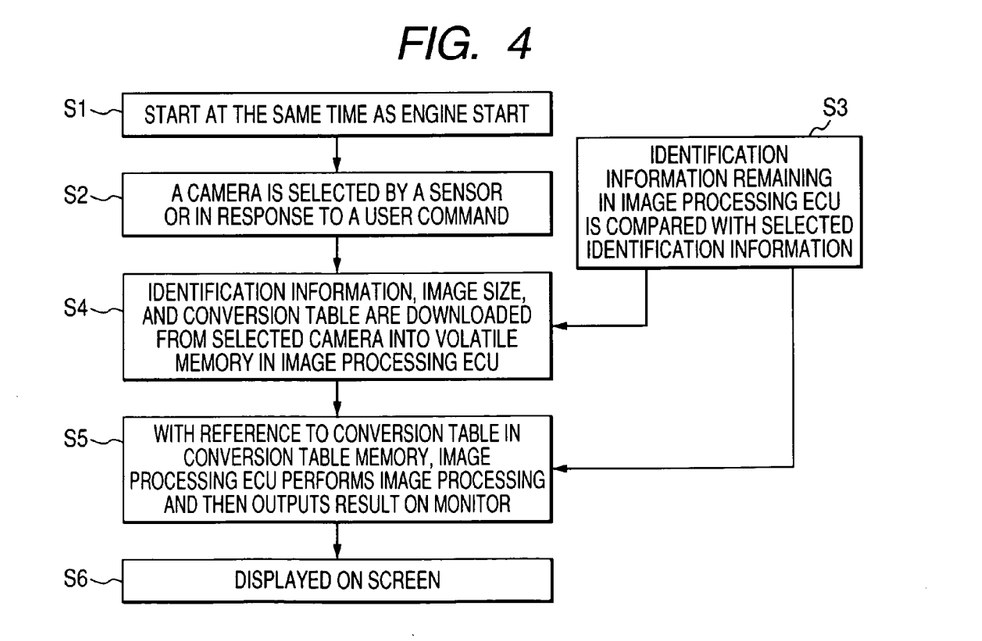
FIG. 4 is a flowchart showing the operation of a vehicle peripheral visual confirmation apparatus according to an embodiment of the invention.

An example of operation of the vehicle peripheral visual confirmation apparatus having the above-mentioned configuration is described below with reference to the flowchart of FIG. 4. First, as shown in step S1 in FIG. 4, the vehicle peripheral visual confirmation apparatus is powered ON and started at the same time as engine start.

Then, in step S2, when predetermined information is provided from the various sensors 41, the situation of the vehicle is determined on the basis of the information. Then, on the basis of the situation of the vehicle, one of a plurality of the cameras 21, 23, 25, and 27 is selected. For example, when the speed sensor detects a backward speed below a predetermined value, and when the sonar sensor detects an obstacle at the rearward of the vehicle, the back camera 21 is selected from a plurality of the cameras 21, 23, 25, and 27. Alternatively, when the user operates an operation input unit not shown, a user-desired camera 21, 23, 25, or 27 is selected.

In step S3, identification information is received from the selected one of the cameras 21, 23, 25, and 27. This reception operation is performed according to the following procedure. That is, a transmission request signal for identification information is transmitted from the image processing ECU 31 to the camera 21, 23, 25, or 27 (selected one). Then, in response to this request, identification information is transmitted from the camera 21, 23, 25 or 27.

Then, this identification information is compared with the identification information already stored in the conversion table memory 49 of the image processing ECU 31. When the two pieces of identification information agree with each other, the pieces of data (the image size and the conversion table) remaining in the conversion table memory 49 are used even after that. Then, the procedure goes to step S5 described later.

In contrast, when the identification information provided from the camera 21, 23, 25 or 27 does not agree with the identification information already stored in the conversion table memory 49, the procedure goes to step S4. Then, the image processing ECU 31 receives (downloads) the image size and the conversion table provided from the nonvolatile memory in the newly selected one of the cameras 21, 23, 25, and 27. This reception (download) operation is performed according to the following procedure. That is, a transmission request signal for the image size and the conversion table is transmitted from the image processing ECU 31 to the camera 21, 23, 25, or 27 (selected one). In response to this request, the image size and the conversion table are transmitted from the camera 21, 23, 25 or 27. Then, the image processing ECU 31 stores the already received identification information and the presently received (downloaded) image size and conversion table in an updating manner (overwrite storage) into the conversion table memory 49 serving as the internal volatile memory.

On the basis of the image size obtained here, the image processing ECU 31 allocates a storage area for the conversion table in the conversion table memory 49 and a storage area for the video image data in the frame memory 51. The case of the conversion table is described below as an example. This conversion table is one-dimensional data and expressed in the form of X+Y*XMAX. Here, the coordinates are expressed as (X, Y), while the horizontal size is denoted by XMAX. The values of these (X,Y) directly express the address of the pixel. Since this data has an extremely large size, storage areas are allocated in the memories 49 and 51 by obtaining the image size in advance. This permits efficient data storing. As such, each frame of the source video image provided from the camera 21, 23, 25, or 27 is stored in the frame memory 51. Then, the procedure goes to step S5.

In step S5, the image processing ECU 31 refers to the conversion table in the conversion table memory 49, and thereby performs predetermined image processing such as coordinate transformation and image scale change. At that time, on the basis of the conversion table, the image processing ECU 31 confirms the destination address of each pixel of the video image per frame which has been read from the frame memory 51, and thereby moves each pixel to the address so as to perform the process.

After that, the video signal for every frame provided from the image processing ASIC 47 is outputted to the monitor I/F section 45. Then, as shown in step S6, a video image is displayed on the display unit (display) 15 via the monitor I/F section 45.

As such, the image processing ECU 31 receives the conversion table of only the selected camera 21, 23, 25, or 27, and thereby performs image processing such as coordinate transformation. This avoids the necessity of storing the conversion tables of all the cameras 21, 23, 25, and 27 into the image processing ECU 31. Thus, it is not necessary to install an expensive nonvolatile memory of large capacity as the conversion table memory 49 into the image processing ECU 31.

Furthermore, the conversion table storage section 103 is mounted in each of the cameras 21, 23, 25, and 27. Thus, for example, even when a camera is to be added or changed afterwards, what is necessary is merely that the image processing ECU 31 receives (downloads) the conversion table from the new camera at the time of execution of image processing and the like. Thus, for example, even when a camera newly put on the market several years after a new car equipped with an image processing ECU 31 has been put on the market is to be added or changed, the addition or the change is achieved without trouble. Furthermore, a camera of QVGA (320×240 pixels) size attached when a new car has been put on the market is easily changed into a camera of upper class such as a VGA (640×480) camera put on the market several years after that. This provides convenience.

Furthermore, each of the cameras 21, 23, 25, and 27 possesses the identification information (camera ID) in advance so that the identification information is transmitted to the image processing ECU 31. This ensures the video images provided from a plurality of the cameras 21, 23, 25, and 27 to be processed by coordinate transformation using the proper conversion tables.

Furthermore, when one of the cameras 21, 23, 25, and 27 is selected, the identification information provided from the selected one of the cameras 21, 23, 25, and 27 is received (downloaded), and then stored into the conversion table memory 49. After that, this identification information is compared with the identification information already stored in the conversion table memory 49. Then, only when the two pieces of identification information differs from each other, the image size and the conversion table is received (downloaded), and then stored into the conversion table memory 49. That is, the information on the conversion table and the image size is downloaded only at the time that the selection of the cameras 21, 23, 25, and 27 is actually changed. This avoids useless communication in the in-vehicle LAN 29.

Furthermore, the image size is stored in advance in each of the cameras 21, 23, 25, and 27 so that the image size of the selected one of the cameras 21, 23, 25, and 27 is transmitted. Thus, even when a camera image of different image size is transmitted, a storage area for the corresponding conversion table is easily allocated in the conversion table memory 49 in the image processing ECU 31. Furthermore, a storage area for the video image data of the cameras 21, 23, 25, and 27 is easily allocated in the frame memory 51 in the image processing ECU 31.

In the above-mentioned embodiment, the conversion table of only the selected one of the cameras 21, 23, 25, and 27 has been stored in the conversion table memory 49 in the image processing ECU 31. A plurality of conversion tables may be stored in the conversion table memory 49. This avoids the repeated download of an original conversion table and allows the use of the conversion table read out from the conversion table memory 49, when the selection is changed back into an original one of the cameras 21, 23, 25, and 27. This permits effective use of an excess of storage area in the conversion table memory 49. In this case, when the selection of the cameras 21, 23, 25, and 27 is actually changed, that is, when a camera 21, 23, 25, or 27 having such identification information (camera ID) that is not present in the conversion table memory 49 is selected, the identification information (camera ID), the image size, and the conversion table are written into a free area of the conversion table memory 49.

For simplicity of description, the above-mentioned embodiment has been given for an example that only one of a plurality of cameras 21, 23, 25, and 27 is selected and then displayed on a screen. However, depending on the situation of the vehicle, a plurality of the cameras 21, 23, 25, and 27 may be selected simultaneously and displayed on a screen as multi-image display.

The above-mentioned embodiment has been given for an example that viewpoint conversion is performed as an example of coordinate transformation. However, in addition to this, the invention may be applied to any coordinate transformation including expansion, reduction, distortion correction, image rotation, vertical inversion, and horizontal inversion.

What is claimed is:

1. A vehicle peripheral visual confirmation apparatus comprising:
   at least one imaging member imaging a vehicle's peripheral image, the at least one imaging member holding a converstion table of a predetermined coordinate transformation with respect to the vehicle's peripheral image;
   an image processing member selecting at least one imaging member, and performing the predetermined coordinate transformation on the vehicle's peripheral image imaged by the selected imaging member; and
   a displaying member disposed on a vehicle compartment, the displaying member displaying the vehicle's peripheral image on which the predetermined coordinate transformation is performed,
   wherein the image processing member performs the coordinate transformation on the basis of the conversion table of the selected imaging member.

2. A vehicle peripheral visual confirmation apparatus according to claim 1, wherein the at least one imaging member holds, in advance, identification information identifying the at least one imaging member, and the identification information is transmitted from the selected imaging member to the image processing member.

3. A vehicle peripheral visual confirmation apparatus according to claim 2, wherein
   the image processing member stores the conversion table acquired from the at least one imaging member and the identification information corresponding to the conversion table for the at least one imaging member, into a predetermined volatile storage member, and
   only when the identification information acquired from the selected imaging member differs from the identification information already stored in the volatile storage member, the conversion table is transmitted from the selected imaging member to the image processing member.

4. A vehicle peripheral visual confirmation apparatus according to claim 1, wherein the at least one imaging member holds information on image size of the vehicle's peripheral image acquired by the at least one imaging member, and the information on the image size is transmitted to the image processing member.

5. A vehicle peripheral visual confirmation apparatus according to claim 1, wherein the at least one imaging member includes a plurality of imaging members, and the image processing member is capable of storing a conversion table of the plurality of imaging members.

* * * * *

UNITED STATES PATENT AND TRADEMARK OFFICE
CERTIFICATE OF CORRECTION

PATENT NO. : 7,496,213 B2
APPLICATION NO. : 11/109645
DATED : February 24, 2009
INVENTOR(S) : Akinobu Yoshimura Page 1 of 1

It is certified that error appears in the above-identified patent and that said Letters Patent is hereby corrected as shown below:

On the Title Page

Item (73) should read

Assignees:   Autonetworks Technologies, Ltd., ~~Mei~~ Mie (JP);
Sumitomo Wiring Systems, Ltd., ~~Mei~~ Mie (JP);
Sumitomo Electric Industries, Ltd., Osaka (JP)

Signed and Sealed this

Nineteenth Day of May, 2009

JOHN DOLL
*Acting Director of the United States Patent and Trademark Office*